United States Patent
Adams

(10) Patent No.: US 9,303,810 B2
(45) Date of Patent: Apr. 5, 2016

(54) SUPPORTING DEVICE FOR AN ELECTRONIC DEVICE

(71) Applicant: John Eastman Adams, Clarkston, MI (US)

(72) Inventor: John Eastman Adams, Clarkston, MI (US)

( * ) Notice: Subject to any disclaimer, the term of this patent is extended or adjusted under 35 U.S.C. 154(b) by 0 days.

(21) Appl. No.: 14/576,512

(22) Filed: Dec. 19, 2014

(65) Prior Publication Data

US 2015/0176756 A1 Jun. 25, 2015

Related U.S. Application Data

(60) Provisional application No. 61/693,907, filed on Dec. 19, 2013, provisional application No. 61/995,989, filed on Apr. 28, 2014.

(51) Int. Cl.
*F16M 11/00* (2006.01)
*F16M 11/38* (2006.01)
*F16M 13/00* (2006.01)

(52) U.S. Cl.
CPC ............... *F16M 11/38* (2013.01); *F16M 13/00* (2013.01); *Y10T 29/49908* (2015.01)

(58) Field of Classification Search
CPC combination set(s) only.
See application file for complete search history.

(56) References Cited

U.S. PATENT DOCUMENTS

| | | | | |
|---|---|---|---|---|
| 2,165,255 A | * | 7/1939 | Hamilton | 248/455 |
| 3,355,828 A | * | 12/1967 | Betz | 40/750 |
| 4,044,980 A | | 8/1977 | Cummins | |
| 4,460,146 A | * | 7/1984 | Raggiotti | 248/456 |
| 4,512,541 A | * | 4/1985 | Lietzke | 248/459 |
| 4,674,724 A | * | 6/1987 | Gaudet | 248/459 |
| 4,893,838 A | * | 1/1990 | Wober | 281/45 |
| 4,905,947 A | * | 3/1990 | Henne et al. | 248/174 |
| 5,083,663 A | * | 1/1992 | Conway et al. | 206/45.26 |
| 5,165,649 A | * | 11/1992 | Neumann et al. | 248/459 |
| 5,344,004 A | * | 9/1994 | Meyer | 206/45.25 |
| 5,660,365 A | * | 8/1997 | Glick | 248/459 |
| 5,667,182 A | | 9/1997 | Kribs | |
| 7,185,869 B2 | * | 3/2007 | Smith | 248/456 |
| 7,537,192 B2 | | 5/2009 | Al-Haleem et al. | |
| 7,654,499 B2 | | 2/2010 | Lane | |
| 7,818,904 B2 | * | 10/2010 | Wagner | 40/124.18 |
| 7,861,995 B2 | * | 1/2011 | Liou | 248/454 |

(Continued)

OTHER PUBLICATIONS

"DIY-Smartphone tripod/stand version 3"; Design by Benny Johansson: 3 pages; printed on Feb. 4, 2015; http://www.benvelo.com/phone_tripod_3.htm.

(Continued)

*Primary Examiner* — Monica Millner
(74) *Attorney, Agent, or Firm* — Buckert Patent & Trademark Law Firm, PC; John F. Buckert

(57) ABSTRACT

A supporting device for an electronic device is provided. The supporting device includes a plastic card defining first and second support tabs. The first and second support tabs define a gap therebetween that is sized to hold the electronic device therein when the first support tab is at a second operational position thereof and the second support tab is at a second operational position thereof. The first support tab is adapted to contact a first side of the electronic device when the first support tab is at the second operational position thereof, and the second support tab being adapted to contact a second side of the electronic device when the second support tab is at the second operational position thereof, such that the electronic device is held at a desired operational position between the first and second support tabs.

17 Claims, 6 Drawing Sheets

(56) References Cited

U.S. PATENT DOCUMENTS

| | | | |
|---|---|---|---|
| 8,282,065 B1 | 10/2012 | Stone | |
| 9,022,341 B2* | 5/2015 | Radmard | 248/558 |
| 2008/0230672 A1* | 9/2008 | Pachowski | A47B 23/044 248/453 |
| 2009/0114790 A1* | 5/2009 | Fan | 248/346.5 |
| 2011/0278421 A1* | 11/2011 | Guldalian | 248/459 |
| 2013/0026329 A1* | 1/2013 | Lane et al. | 248/459 |
| 2014/0143958 A1* | 5/2014 | Barr | 7/138 |

OTHER PUBLICATIONS

"The OriCardi Horizontal Credit Card Desk Stand—Triple Pack"; 4 pages, printed on Feb. 4, 2015;http://www.mobilefun.co.uk/the-oricardi-horizontal-credit-card-desk-stand-triple-pack-p39542.htm.

* cited by examiner

SUPPORTING DEVICE FOR AN ELECTRONIC DEVICE

CROSS-REFERENCE TO RELATED APPLICATIONS

This application claims priority to U.S. Provisional Patent Application Nos. 61/963,907, filed on Dec. 19, 2013, and 61/995,989, filed on Apr. 28, 2014, the entire contents of which are hereby incorporated by reference herein.

BACKGROUND

The inventor herein has recognized a need for an improved supporting device for an electronic device.

SUMMARY

A supporting device for an electronic device in accordance with an exemplary embodiment is provided. The supporting device includes a plastic card defining first and second support tabs. The first support tab is adapted to be rotated about a first bend line from a first operational position to a second operational position thereof. The second support tab is adapted to be rotated about a second bend line from a first operational position to a second operational position thereof. The first bend line is substantially perpendicular to the second bend line. The first and second support tabs define a gap therebetween that is sized to hold the electronic device therein when the first support tab is at the second operational position thereof and the second support tab is at the second operational position thereof. The first support tab is adapted to contact a first side of the electronic device when the first support tab is at the second operational position thereof, and the second support tab being adapted to contact a second side of the electronic device when the second support tab is at the second operational position thereof, such that the electronic device is held at a desired operational position between the first and second support tabs.

A method of supporting an electronic device utilizing a supporting device in accordance with another exemplary embodiment is provided. The method includes providing the supporting device comprising a plastic card that defines first, second support tabs. The method further includes moving the first support tab from a first operational position to a second operational position thereof. The method further includes moving the second support tab from a first operational position to a second operational position thereof, such that a first gap is formed between the first support tab and the second support tab when the first support tab is at the second operational position thereof, and the second support tab is at the second operational position thereof. The method further includes disposing the electronic device within the first gap such that the first support tab contacts a first side of the electronic device when the first support tab is at the second operational position thereof, and the second support tab contacts a second side of the electronic device when the second support tab is at the second operational position thereof.

DETAILED DESCRIPTION

Figure 1:
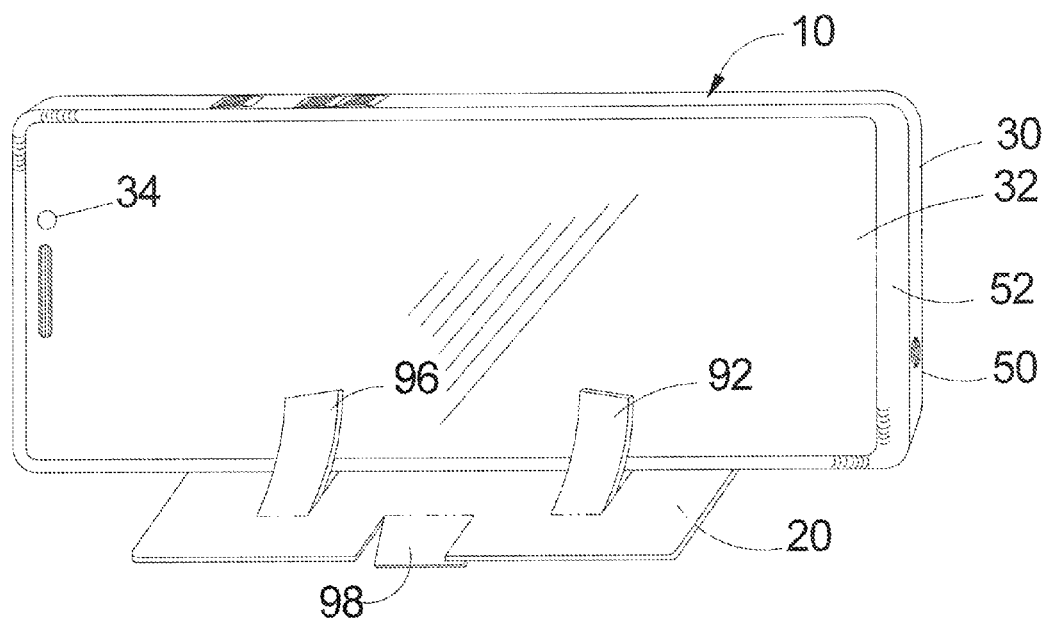
FIG. 1 is a schematic of an electronic device being supported by a supporting device in accordance with an exemplary embodiment.

Referring to FIGS. 1-4, an electronic device 10 is illustrated that is supported by the supporting device 20 in accordance with an exemplary embodiment. An advantage of the supporting device 20 is that the supporting device 20 comprises a plastic card 70 having tabs that can be easily positioned for supporting the electronic device 10 for taking photographs (e.g., selfies) with the electronic device 10. Further, the plastic card 70 can be easily transported and stored in a wallet or a purse.

The term "substantially perpendicular" means being within 20 degrees of a perpendicular orientation relative to one another. The term "substantially parallel" means being within 20 degrees of a parallel orientation relative to one another.

In an exemplary embodiment, the electronic device 10 is a smart phone. However, in an alternative embodiment, the electronic device 10 could be an electronic camera, a tablet computer equipped with a camera, or an electronic video recording device. The electronic device 10 includes a housing 30, a touchscreen 32, a camera lens 34, a camera lens 36 (shown in FIG. 2), and internal camera (not shown) operably coupled to the camera lenses 34, 36. The touchscreen 32 and the camera lens 34 are disposed on and coupled to a first side 50 of the housing 30. The camera lens 36 is disposed on and coupled to a second side 52 of the housing 30. During operation, the electronic device 10 is adapted to take photographs of objects in front of the camera lens 34 or the camera lens 36. Further, during operation the internal camera is configured to take delayed photographs of objects in front of the camera lens 34 or the camera lens 36.

Figure 5:
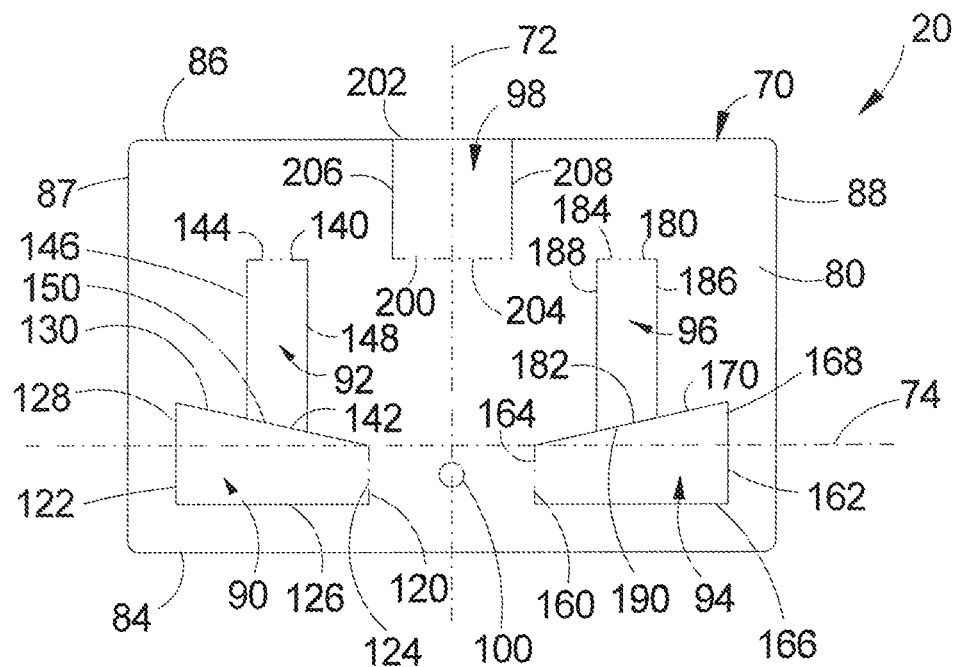
FIG. 5 is a schematic of a first side of the supporting device of FIG. 1.
Figure 6:
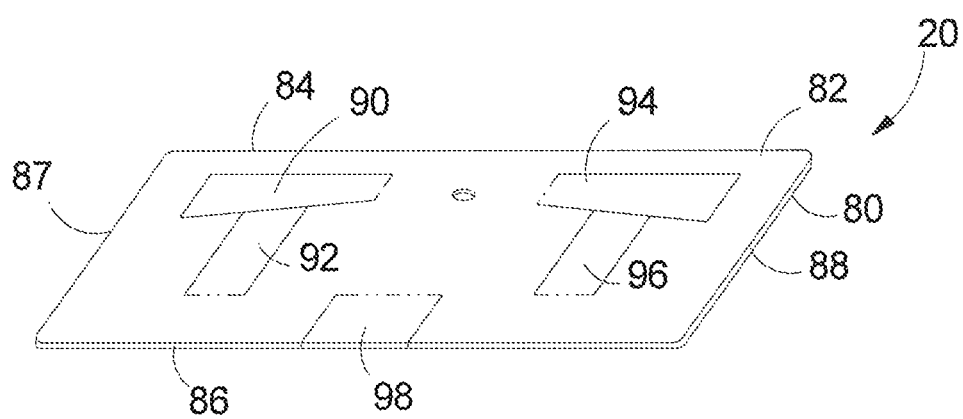
FIG. 6 is a schematic of a second side of the supporting device of FIG. 1.
Figure 7:
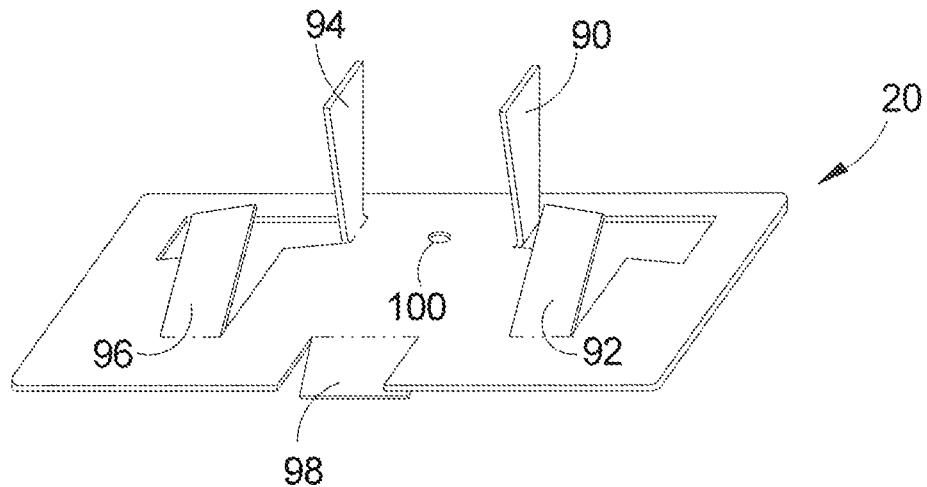
FIG. 7 is a schematic of the supporting device of FIG. 1 having first, second, third, and fourth support tabs and an elevation adjustment tab with operational positions for receiving and supporting the electronic device, before the electronic device is disposed on the supporting device.
Figure 8:
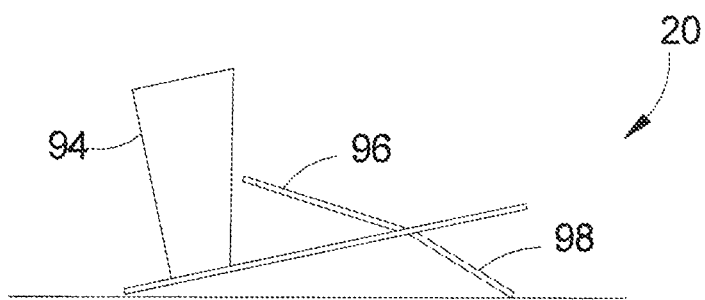
FIG. 8 is a side view of the supporting device of FIG. 7.
Figure 9:
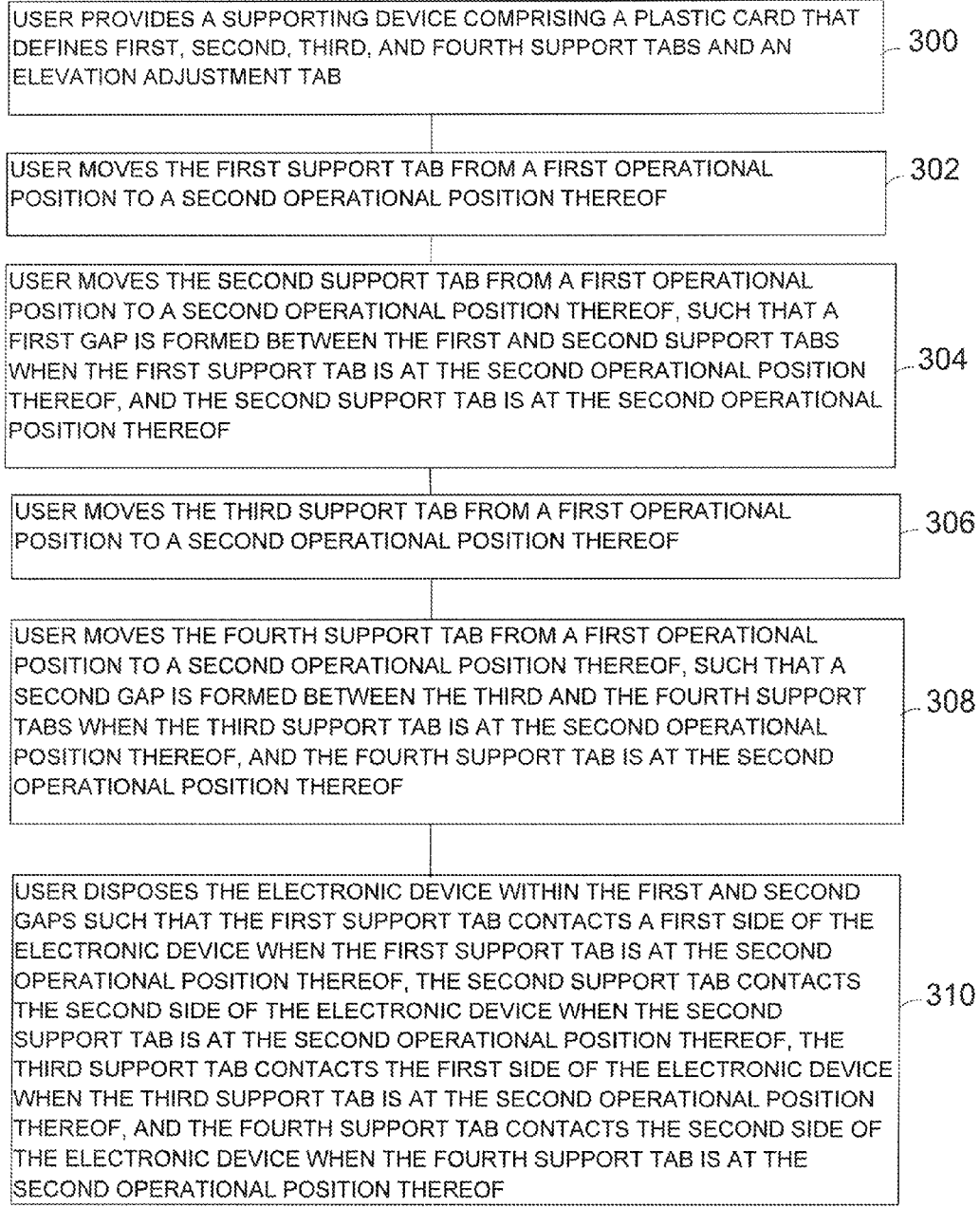
FIGS. 9-10 is a flowchart of a method for supporting an electronic device utilizing the supporting device of FIG. 1 in accordance with another exemplary embodiment.
Figure 10:
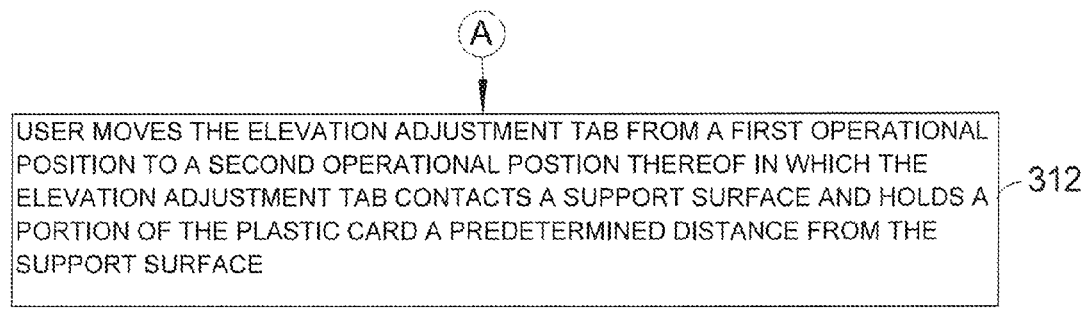

Referring to FIGS. 5 and 6, the supporting device 20 includes a plastic card 70 having a first axis 72 and the second axis 74. The second axis 74 is disposed substantially perpendicular to the first axis 72. The plastic card 70 is centered about the first axis 72. In an alternative embodiment, the plastic card 70 could be replaced with an alternative card having an identical structure and size as the plastic card 70 except that the alternative card could be constructed of another material such as a paper material, or a cardboard material, or a metal for example.

The plastic card 70 includes a first side 80, a second side 82, a first edge 84, a second edge 86, a third edge 87, and a fourth edge 88. The first and second edges 84, 86 extend substantially parallel to one another and substantially parallel to the axis 74. The third and fourth edges 87, 88 extend substantially parallel to one another and perpendicular to the first and second edges 84, 86 and substantially parallel to the axis 72. Further, the third and fourth edges 87, 88 are connected to and extend between the first and second edges 84, 86. In an exemplary embodiment, the plastic card 70 is substantially rectangular shaped. Further, in an exemplary embodiment, a distance between the first and second edges 84, 86 is in a range of 3-3.5 inches, and a distance between the third and fourth edges 87, 88 is in a range of 2-2.5 inches. In an alternative embodiment, the plastic card 70 could have another shape, such as a square shape for example.

The plastic card 70 defines a first support tab 90, a second support tab 92, a third support tab 94, a fourth support tab 96, and an elevation adjustment tab 98. The plastic card 70 further includes an aperture 100 extending therethrough that is centered on the first axis 72 for receiving a mounting bolt therethrough from a camera stand.

Figure 2:
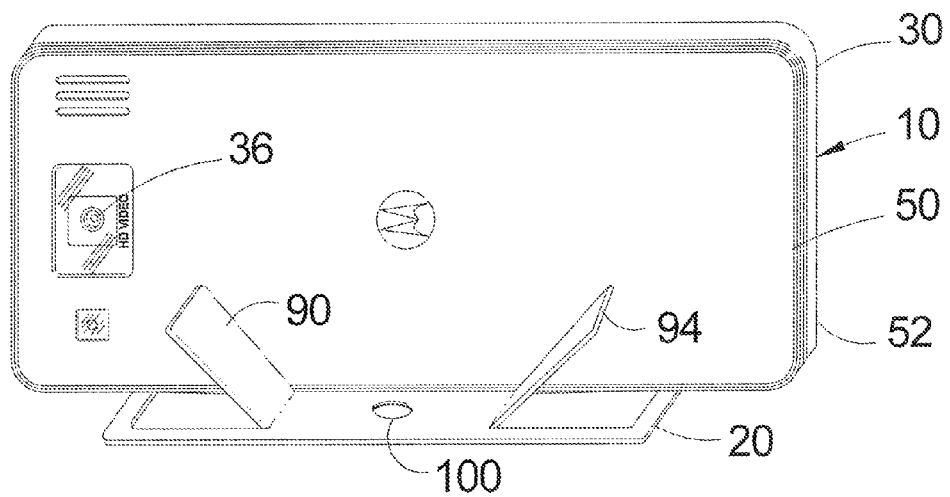
FIG. 2 is another schematic of the electronic device and the supporting device of FIG. 1.

Referring to FIGS. 1, 2, and 5, the first support tab 90 is adapted to be rotated about a first bend line 124 from a first operational position (shown in FIG. 5) to a second operational position (shown in FIG. 2) thereof. The second support tab 92 is adapted to be rotated about a second bend line 144 from a first operational position (shown in FIG. 5) to a second operational position (shown in FIG. 1) thereof. The first bend line 124 is substantially perpendicular to the second bend line 144. The first and second support tabs 90, 92 define a gap therebetween that is sized to hold the electronic device 10 therein when the first support tab 90 is at the second operational position thereof and the second support tab 92 is at the second operational position thereof. The first support tab 90 is adapted to contact a first side 50 of the electronic device 10 when the first support tab 90 is at the second operational position thereof, and the second support tab 92 is adapted to contact a second side 52 of the electronic device 10 when the second support tab 92 is at the second operational position thereof, such that the electronic device 10 is held at a desired operational position between the first and second support tabs 90, 92.

The third support tab 94 is adapted to be rotated about a third bend line 164 from a first operational position (shown in FIG. 5) to a second operational position (shown in FIG. 2) thereof. The fourth support tab 96 is adapted to be rotated about a fourth bend line 184 from a first operational position (shown in FIG. 5) to a second operational position (shown in FIG. 1) thereof. The third bend line 164 is substantially perpendicular to the fourth bend line 184. The third and fourth support tabs 94, 96 define a gap therebetween that is sized to hold the electronic device 10 therein when the third support tab 94 is at the second operational position thereof and the fourth support tab 96 is at the second operational position thereof. The third support tab 94 is adapted to contact the first side 50 of the electronic device 10 when the third support tab 94 is at the second operational position thereof, and the fourth support tab 96 is adapted to contact the second side 52 of the electronic device 10 when the fourth support tab 96 is at the second operational position thereof, such that the electronic device 10 is held at a desired operational position between the third and fourth support tabs 94, 96.

Referring to FIGS. 5 and 6, the first support tab 90 includes a first end 120 and a second end 122. The first support tab 90 is formed by first, second, and third cut lines 126, 128, 130 extending through the plastic card 70. The first end 120 defines the first bend line 124 that is substantially parallel to the first axis 72 and is disposed proximate to the first axis 72. The second end 122 is disposed proximate to the third edge 87. The first support tab 90 is rotatable relative to the first bend line 124, or rotatable about the first bend line 124. The first cut line 126 extends substantially parallel to the first edge 84 from the first bend line 124 toward the third edge 87. The second cut line 128 extends substantially parallel to the third edge 87 from the first cut line 126 toward the second edge 86. The third cut line 130 extends from the second cut line 128 toward the fourth edge 88. Further, the third cut line 130 extends from the first bend line 124 to the second cut line 128 at an acute angle relative to the second axis 74.

The second support tab 92 has a first end 140 and a second end 142. The second support tab 92 is defined by the first, second, and third cut lines 146, 148, 150 extending through the plastic card 70. The first end 140 defines the second bend line 144 that is substantially perpendicular to the first axis 72. The second support tab 92 is disposed between the second edge 86 and the first support tab 90. The second end 142 is disposed proximate to the first support tab 90. The second support tab 92 is rotatable relative to the second bend line 144, or rotatable about the second bend line 144. The first cut line 146 extends substantially parallel to the first edge 84 from the second bend line 144 toward the first edge 84. The second cut line 148 extends substantially parallel to the first edge 84 from the second bend line 144 toward the first edge 84. The second cut line 148 is disposed a predetermined distance away from the first cut line 146. The third cut line 150 extends from the first cut line 146 to the second cut line 148 at the second end 142 of the second support tab 92. The third cut line 150 extends at an acute angle relative to the second axis 74. In an exemplary embodiment, the third cut line 150 is coincident with the cut line 130 of the first support tab 90.

The third support tab 94 has a first end 160 and a second end 162. The third support tab 94 is formed by first, second, and third cut lines 166, 168, 170 extending through the plastic card 70. The first end 160 defines the third bend line 164 that is substantially parallel to the first axis 72 and is disposed proximate to the first axis 72. The second end 162 is disposed proximate to the fourth edge 88. The third support tab 94 is rotatable relative to the third bend line 164. The first cut line 166 extends substantially parallel to the first edge 84 from the third bend line 164 toward the fourth edge 88. The second cut line 168 extends substantially parallel to the fourth edge 88 from the first cut line 166 toward the second edge 86. The third cut line 170 extends from the second cut line 168 toward the third edge 87. Further, the third cut line 170 extends from the third bend line 164 to the second cut line 168 at an acute angle relative to the second axis 74.

The fourth support tab 96 has a first end 180 and a second end 182. The fourth support tab 96 is defined by the first, second, and third cut lines 186, 188, 190 extending through the plastic card 70. The first end 180 defines the fourth bend line 184 that is substantially perpendicular to the first axis 72. The fourth support tab 96 is disposed between the second edge 86 and the third support tab 94. The second end 182 is disposed proximate to the third support tab 94. The fourth support tab 96 is rotatable relative to the fourth bend line 184, or rotatable about the fourth bend line 184. The first cut line 186 extends substantially parallel to the first edge 84 from the fourth bend line 184 toward the first edge 84. The second cut line 188 extends substantially parallel to the first edge 84 from the fourth bend line 184 toward the first edge 84. The second cut line 188 is disposed a predetermined distance away from the first cut line 186. The third cut line 190 extends from the first cut line 186 to the second cut line 188 at the second end 182 of the fourth support tab 96. The third cut line 190 extends at an acute angle relative to the second axis 74. In an exemplary embodiment, the third cut line 190 is coincident with the cut line 170 of the third support tab 94.

Figure 3:
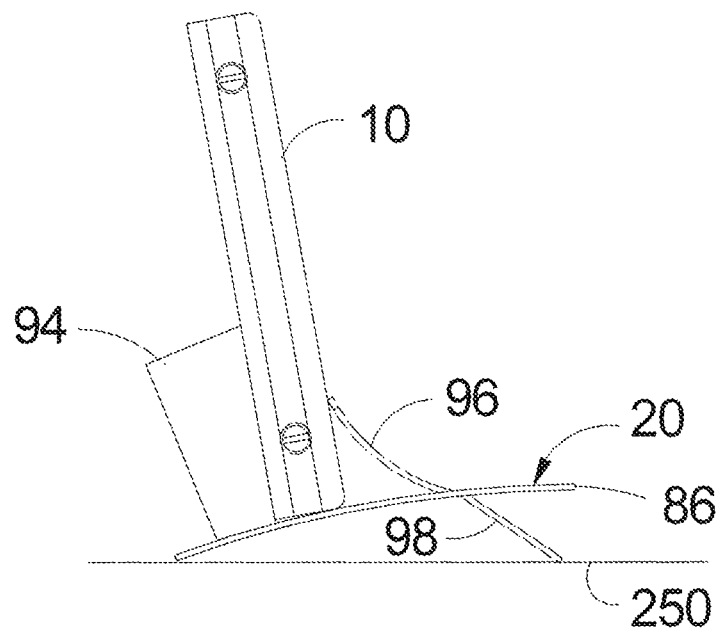
FIG. 3 is a side view of the electronic device and the supporting device of FIG. 1 wherein the supporting device is supporting the electronic device at a first predetermined angle relative to the supporting surface.
Figure 4:
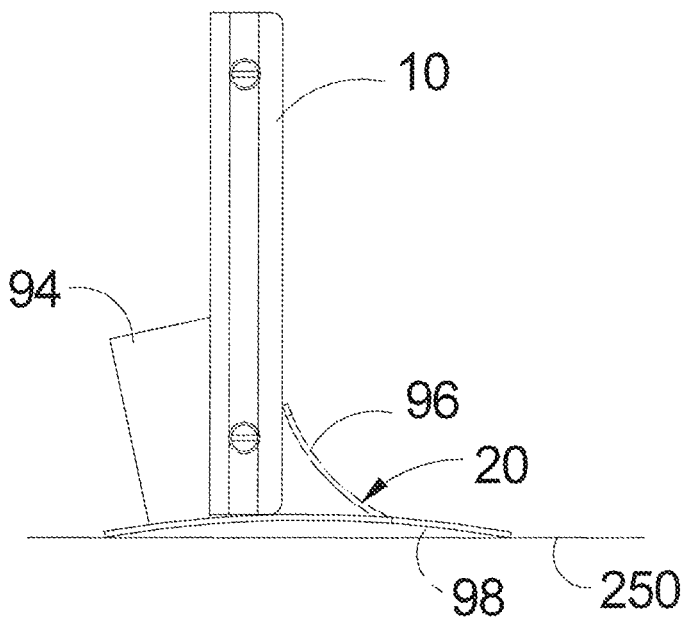
FIG. 4 is another side view of the electronic device and the supporting device of FIG. 1 wherein the supporting device is supporting the electronic device at a second predetermined angle relative to the supporting surface.

Referring to FIGS. 1 and 3-5, the elevation adjustment tab 98 has a first operational position (shown in FIG. 5) and a second operational position (shown in FIG. 3). At the second operational position, the elevation adjustment tab 98 contacts a support surface 250 and holds a portion of the plastic card 70 a predetermined distance from the support surface 250. The elevation adjustment tab 98 has a first end 200 and a second end 202. The first end 200 defines a fifth bend line 204 that is substantially perpendicular to the first axis 72. The second end 202 is coincident with the second edge 86. The elevation adjustment tab 98 is disposed between the second and fourth support tabs 92, 96. The elevation adjustment tab 98 is rotatable relative to the fifth bend line 204, or rotatable about the fifth bend line 204. At the second operational position, the elevation adjustment tab 98 contacts the support surface 250 and holds the second edge 86 of the plastic card 70 the predetermined distance from the support surface 250.

Referring to FIGS. 1, 2, 9 and 10, a method for supporting the electronic device 10 utilizing the supporting device 20 in accordance with another exemplary embodiment will now be explained.

At step 300, the user provides the supporting device 20 having the plastic card 70 that defines first, second, third, and fourth support tabs 90, 92, 94, 96 and an elevation adjustment tab 98.

At step 302, the user moves the first support tab 90 from a first operational position to a second operational position thereof.

At step 304, the user moves the second support tab 92 from a first operational position to a second operational position thereof, such that a first gap is formed between the first and second support tabs 90, 92 when the first support tab 90 is at the second operational position thereof, and the second support tab 92 is at the second operational position thereof.

At step 306, the user moves the third support tab 94 from a first operational position to a second operational position thereof.

At step 308, the user moves the fourth support tab 96 from a first operational position to a second operational position thereof, such that a second gap is formed between the third and fourth support tabs 94, 96 when the third support tab 94 is at the second operational position thereof, and the fourth support tab 96 is at the second operational position thereof.

At step 310, the user disposes the electronic device 10 within the first and second gaps such that the first support tab 90 contacts a first side 50 of the electronic device 10 when the first support tab 90 is at the second operational position thereof, the second support tab 92 contacts the second side 52 of the electronic device 10 when the second support tab 92 is at the second operational position thereof, the third support tab 94 contacts the first side 50 of the electronic device 10 when the third support tab 94 is at the second operational position thereof, and the fourth support tab 96 contacts the second side 52 of the electronic device 10 when the fourth support tab 96 is at the second operational position thereof.

At step 312, the user moves the elevation adjustment tab 98 from a first operational position to a second operational position thereof in which the elevation adjustment tab 98 contacts a support surface 250 and holds a portion of the plastic card 70 a predetermined distance from the support surface 250.

The supporting device described herein provides a substantial advantage over other devices. In particular, the supporting device has a technical effect of utilizing a plastic card 70 having tabs that can be easily positioned for supporting an electronic device for taking photographs (e.g., selfies) with the electronic device. Further, plastic card can be easily transported and stored in a wallet or a purse.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A supporting device, comprising:
a plastic card having first, second, third, and fourth support tabs, the plastic card further having first, second, third, and fourth edges; the plastic card being centered about a first axis, the third and fourth edges being connected to and extending between the first and second edges;
the first support tab having a first end and a second end; the first end of the first support tab defining a first bend line that is substantially parallel to the first axis and being disposed proximate to the first axis, the second end of the support tab being disposed proximate to the third edge; the first support tab adapted to be rotated about the first bend line from a first operational position to a second operational position thereof;
the second support tab having a first end and a second end; the first end of the second support tab defining a second bend line that is substantially perpendicular to the first axis, the second support tab being disposed between the second edge and the first support tab, the second end of the second support tab being disposed proximate to the first support tab, the second support tab adapted to be rotated about the second bend line from a first operational position to a second operational position thereof, the first bend line being substantially perpendicular to the second bend line;
the first and second support tabs defining a first gap therebetween when the first support tab is at the second operational position thereof and the second support tab is at the second operational position thereof;
the third support tab adapted to be rotated about a third bend line from a first operational position to a second operational position thereof;
the fourth support tab adapted to be rotated about a fourth bend line from a first operational position to a second operational position thereof, the fourth bend line being substantially perpendicular to the third bend line;
the third and fourth support tabs defining a second gap therebetween when the third support tab is at the second operational position thereof and the fourth support tab is at the second operational position thereof;
the first support tab having a linearly-extending edge; a length of the linearly-extending edge of the first support tab being greater than a length of the first bend line;
the third support tab having a linearly-extending edge; a length of the linearly-extending edge of the third support tab being greater than a length of the third bend line; an elevation adjustment tab having an operational position in which the elevation adjustment tab contacts a support surface and holds a portion of the plastic card a predetermined distance from the support surface.

2. The supporting device of claim 1, wherein the third support tab having a first end and a second end; the first end of the third support tab defining the third bend line that is substantially parallel to the first axis and being disposed proximate to the first axis, the second end of the third support tab being disposed proximate to the fourth edge; and
the fourth support tab having a first end and a second end; the first end of the fourth support tab defining the fourth bend line that is substantially perpendicular to the first axis, the fourth support tab being disposed between the second edge and the third support tab, the second end of the fourth support tab being disposed proximate to the third support tab.

3. The supporting device of claim 2, wherein the elevation adjustment tab has a first end and a second end; the first end of the elevation adjustment tab defining a fifth bend line that is substantially perpendicular to the first axis, the second end of the elevation adjustment tab being coincident with the second edge, the elevation adjustment tab being disposed between the second and fourth support tabs, the elevation adjustment tab adapted to be rotated about the fifth bend line from a first operational position to a second operational position thereof; and the elevation adjustment tab contacting the support surface and holds the second edge of the plastic card the predetermined distance from the support surface when the elevation adjustment tab is at the second operational position thereof.

4. The supporting device of claim 1, wherein the first and second edges of the plastic card extend substantially parallel to one another.

5. The supporting device of claim 4, wherein the third and fourth edges of the plastic card extend substantially parallel to one another and substantially perpendicular to the first and second edges.

6. The supporting device of claim 1, wherein a distance between the first and second edges of the plastic card is in a range of 3-3.5 inches, and a distance between the third and fourth edges of the plastic card is in a range of 2-2.5 inches.

7. The supporting device of claim 1, wherein the first support tab is formed with first, second, and third cut lines extending through the plastic card.

8. The supporting device of claim 7, wherein the first cut line extending substantially parallel to the first edge from the first bend line toward the third edge, the second cut line extending substantially parallel to the third edge from the first cut line toward the second edge, the third cut line extending from the second cut line toward the fourth edge.

9. The supporting device of claim 8, wherein the plastic card further includes a second axis extending perpendicular to the first axis, the third cut line extending from the first bend line to the second cut line at an acute angle relative to the second axis.

10. The supporting device of claim 1, wherein the second support tab is formed with first, second, and third cut lines extending through the plastic card.

11. The supporting device of claim 10, wherein the first cut line extending substantially parallel to the first edge from the second bend line toward the first edge, the second cut line extending substantially parallel to the first edge from the second bend line toward the first edge, the first cut line being disposed a predetermined distance away from the second cut line, the third cut line extending from the first cut line to the second cut line at the second end of the second support tab.

12. The supporting device of claim 11, wherein the plastic card further includes a second axis extending perpendicular to the first axis, the third cut line extending at an acute angle relative to the second axis.

13. The supporting device of claim 1, wherein the plastic card is substantially rectangular-shaped.

14. The supporting device of claim 1, further comprising an aperture extending through the plastic card, the aperture being centered along the first axis.

15. A method of supporting an electronic device utilizing a supporting device, comprising:
providing the supporting device comprising a plastic card having first, second, third, and fourth edges; the third and fourth edges being connected to and extending between the first and second edges, the plastic card further having first, second, third, and fourth support tabs having first, second, third, and fourth bend lines, respectively; the first and second bend lines being substantially perpendicular to one another, the third and fourth bend lines being substantially perpendicular to one another, the second and fourth bend lines being collinear with one another;
moving the first support tab from a first operational position to a second operational position thereof;
moving the second support tab from a first operational position to a second operational position thereof, such that a first gap is formed between the first support tab and the second support tab when the first support tab is at the second operational position thereof, and the second support tab is at the second operational position thereof;
moving the third support tab from a first operational position to a second operational position thereof;
moving the fourth support tab from a first operational position to a second operational position thereof, such that a second gap is formed between the third support tab and the fourth support tab when the third support tab is at the second operational position thereof, and the fourth support tab is at the second operational position thereof; and
disposing the electronic device within the first and second gaps such that the first and third support tabs contact a first side of the electronic device when the first support tab is at the second operational position thereof and the third support tab is at the second operational position thereof, and the second and fourth support tabs contact a second side of the electronic device when the second support tab is at the second operational position thereof and the fourth support tab is at the second operational position thereof.

16. The method of claim 15, wherein the plastic card further defines an elevation adjustment tab, the method further comprising:
moving the elevation adjustment tab from a first operational position to a second operation position thereof in which the elevation adjustment tab contacts a support surface and holds a portion of the plastic card a predetermined distance from the support surface.

17. The supporting device of claim 1, wherein a bend line of the elevation adjustment tab is collinear with the second bend line of the second support tab.

* * * * *